July 20, 1943.   B. W. SEWELL   2,324,956
BORE HOLE TOOL
Filed Nov. 25, 1940   3 Sheets-Sheet 2

Benjamin W. Sewell INVENTOR.
BY P. J. Whelan
Atty.

July 20, 1943.   B. W. SEWELL   2,324,956
BORE HOLE TOOL
Filed Nov. 25, 1940   3 Sheets-Sheet 3

Benjamin W. Sewell INVENTOR.
BY P. J. Whelan
Atty

Patented July 20, 1943

2,324,956

UNITED STATES PATENT OFFICE 2,324,956

BOREHOLE TOOL

Benjamin W. Sewell, Tulsa, Okla., assignor to Standard Oil Development Company, a corporation of Delaware Application November 25, 1940, Serial No. 366,955

3 Claims. (Cl. 255—1)

The present invention is directed to a device for enlarging a section of a bore hole.

It is an object of the present invention to provide a tool which will increase the exposed surface in a portion of a bore hole.

It is a further object of the present invention to provide a cutter which will cut vertical slots extending radially from a bore hole, thereby increasing the surface exposed to the formation.

A further object of the present invention is to provide a continuous cutting chain which may be laterally expanded at any selected point in the bore hole to cut vertical slots in the formation at selected points.

Other objects and advantages of the present invention may be seen from a reading of the following description taken in conjunction with the accompanying drawings in which Fig. 1 is a cross sectional view of a modification of the present invention;

Figure 1:
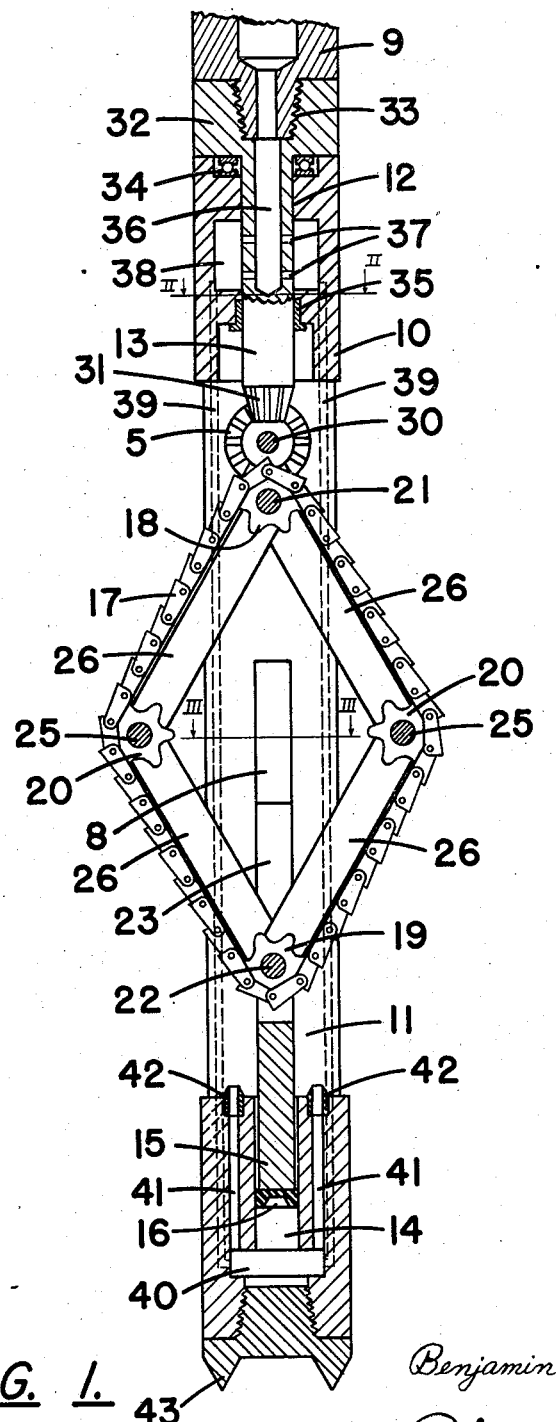

Referring specifically to the drawings and first to Fig. 1, a cylindrical body 10 having a slot 11 arranged in the median portion thereof is provided at its upper end with a centrally positioned longitudinal passage 12 in which is arranged shaft 13. The lower portion of body 10 is provided with a central passage 14 in which is slidably arranged a piston 15 provided at its lower end with a gasket 16 to make a fluid-tight joint with the walls of passage 14.

Arranged within the slotted portion 11 of the body is cutting chain 17 carried by top sprockets 18, bottom sprockets 19 and side sprockets 20. Upper sprockets 18 are rotatively mounted on laterally extending shaft 21 which, in turn, is fastened to body 10 to prevent longitudinal or lateral movement thereof. Lower sprockets 19 are supported by laterally extending shaft 22 which is supported by bifurcated ends 24 with which piston 15 is provided. Ends 24 are arranged to fit slidingly in grooves 8 of block 10. Side sprockets 20 are supported by lateral shafts 25. Shafts 21, 22 and 25 not only support the sprockets upon which the cutting chain 17 runs, but also connects at the ends of the four arms 26.

As will be seen from the drawings, the arms 26 being pivoted at the ends will assume a substantially vertical position when piston 15 is in its lowermost position, but will form a parallelogram as the piston 15 travels upwardly, the angles of the parallelogram being controlled by the position of piston 15, the higher the position of piston 15, the greater the lateral dimension of the parallelogram. Shaft 21 is journaled for rotation in body 10. Sprockets 18 are securely attached to shaft 21 for rotation therewith. A spur gear 29 also attached to shaft 21 for rotation therewith meshes with cog gear 29 which, in turn, is secured to laterally extending shaft 30 for rotation. Also attached to shaft 30 for rotation therewith is ring gear 5. Meshing with ring gear 5 is pinion 31 which is attached to the end of shaft 13.

The upper end of shaft 13 ends in a head 32 provided with pipe threads 33 for attachment to a string of drill pipe 9 in the conventional manner. Bearings 34 separate the head 32 from body 10 to allow free rotation thereof, and bushing 35 arranged in passage 12 aids in keeping shaft 13 in position.

Fluid communication between central passage 14 in which the piston 15 operates and the interior of drill pipe 9 is obtained by passage 36 in shaft 13, side ports 37 opening into enlarged space 38 in body 10, longitudinal passages 39 extending downwardly at the sides of slots 11 and communicating with enlarged portion 40 at the lower end of passage 14. Enlarged portion 40 is in fluid communication not only with central passage 14, but also with side passages 41 which lead upwardly and communicate with slot 11, the ends of passages 41 being provided with wear resisting ports 42.

Figure 2:
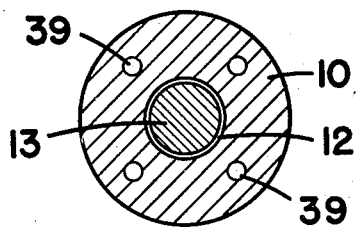
Fig. 2 is a cross sectional view taken along line II—II of Fig. 1.
Figure 4:
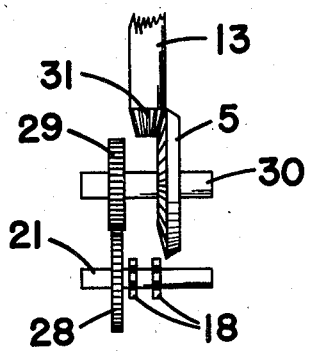
Fig. 4 is a fragmentary view showing the arrangement of the gears for driving the cutting chain.
Figure 3:
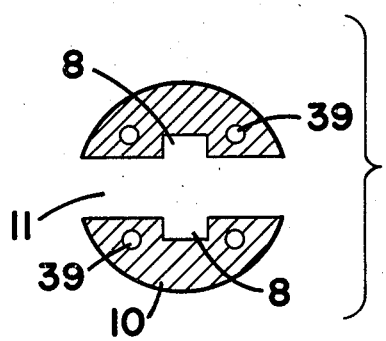
Fig. 3 is a cross sectional view taken along the line III—III of Fig. 1.
Figure 5:
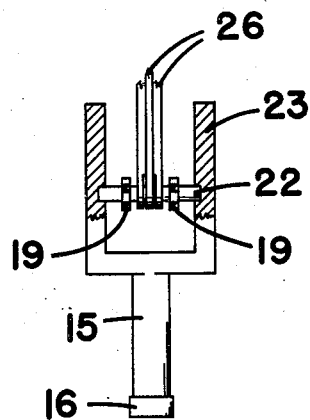
Fig. 5 is a fragmentary view of a portion of the means controlling the lower end of the cutting chain.
Figure 9:
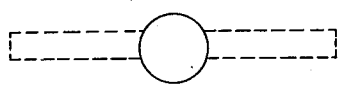
Fig. 9 is a top view.

In the modification shown in Figs. 1 and 2, the lower portion of body 10 is provided with spikes 43 for engagement with the formation at the bottom of the bore hole.

The device described above operates in the following manner. Head 32 is attached to the lower end of drill pipe 9 by threads 33 in the usual manner, and is lowered until the spikes 43 engage the formation at the bottom of the hole, the weight of the drill string resting on the spikes restraining body 10 against rotating movement. Rotation of the drill string then causes relative rotative motion between shaft 13 and body 10 which, in turn, operates cutting chain 17.

Cutting chain 17 is laterally extended by fluid pressure from the drill string flowing through the fluid passages above described to exert pressure on packing 16 to force piston 15 upwardly. The drilling fluid, however, does not remain static within the passages, but, in addition to exerting pressure on piston 15, also passes outwardly through passages 41 and upwardly between the walls of the bore hole and the drilling string to remove the cuttings produced by chain 17. By continuing the exertion of fluid pressure on the lower end of piston 15 and the rotation of the drill stem the lateral extent of the slot will be increased to the maximum fixed by the size of the device. This size may be changed by varying the size of arms 26, the length of cutting chain 13, and the length of piston 15 and passage 14 within which the piston slides.

Figure 6:
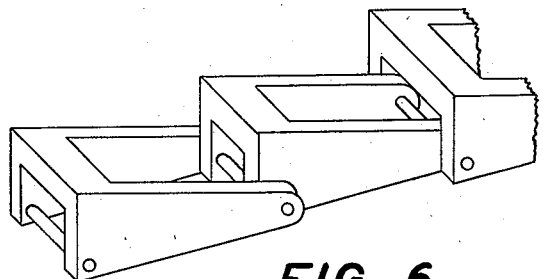
Fig. 6 is an oblique view of a portion of a chain as used in the device shown in Fig. 1.
Figure 7:
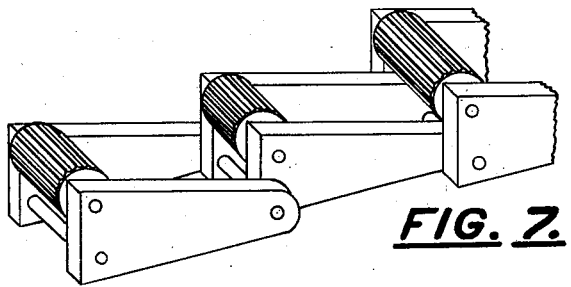
Fig. 7 is an oblique view of a portion of the chain provided with roller cutters which may be used with the device.

An oblique view of the cutting chain shown in Fig. 1 is illustrated in Fig. 6. This is a preferred type of cutting chain to be used in soft formations, but if desired, it may be used in harder formations. However, it will be found advantageous in cutting more difficult formations to use a chain provided with rolling type cutting edges, as illustrated in Fig. 7. It will be understood that the roller cutters shown in this figure operate on the same principle as the conventional roller cutter rock bits used in the art.

Figure 8:
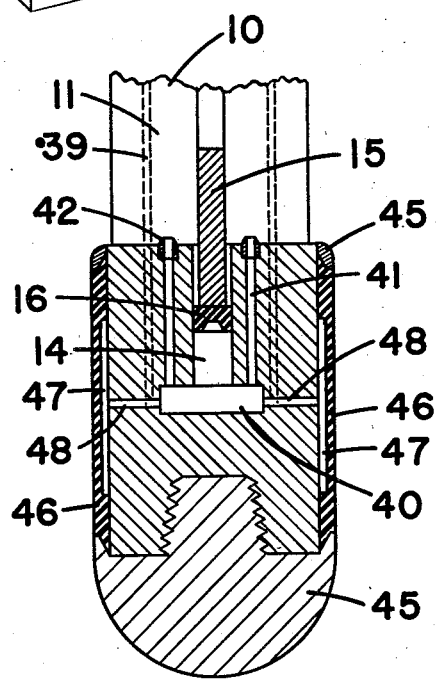
Fig. 8 is a fragmentary sectional view of another modification of the present invention.
Figure 10:
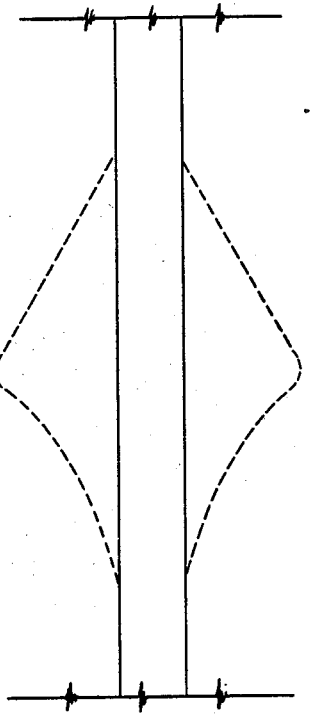
Fig. 10 is a side view of the shape of slots cut in the formation by the devices illustrated.

As a further modification of the present invention instead of using spikes at the lower end of body 10 to hold said body against rotation other means may be used. For example, a hydraulically operated packer in fluid communication with drilling fluid passing through passages 39 may be substituted as means for preventing the rotation of body 10. Such a modification is illustrated in Fig. 8 of the drawings. An advantage in the use of such an arrangement is that slots may be cut in the formation at any desired point in the bore hole.

Hydraulically operated packers are well known in the art and any conventional type may be used, for example, that shown in U. S. Patent No. 2,098,484, issued November 9, 1937. Packers of this type are set merely by an increase in tubing pressure and are released by a decrease of tubing pressure and may accordingly be readily set or removed at any depth in the bore hole, enabling any desired number of slots to be produced at selected depths in the bore hole with one run of tubing.

As shown in Fig. 6 the lower end of body 10 is provided with cap member 45 arranged to enclose and protect the ends of packer 46 embracing body 10. Packer 46 is constructed of a resilient material, such as rubber, and is provided with inflation chamber 47 in communication with the central passage 40 in body 10 by means of ports 48.

It will be manifest that in this modification of the present invention the device arranged at the lower end of a string of drill pipe is lowered into the desired position in a bore hole. Drilling fluid is then pumped down the drill pipe. The pressure exerted by the drilling fluid inflates the packer to hold body 10 against rotation and, in addition, exerts a force on piston 15 to laterally extend the cutting chain. Rotation of the drill pipe causes the cutting chain to cut a slot in the formation, while circulation of drilling fluid serves the several purposes of carrying away cuttings, laterally extending the cutting chain and expanding the packer. When a slot of the desired size is produced, the circulation of drilling fluid is terminated, and the reduced pressure allows lateral contraction of the cutting chain and of the packer so that the device may be placed in another position or removed from the bore hole as desired.

If desired, other suitable means may be used for holding body 10 against rotation while the cutting operation is carried out. It will be appreciated that after a slot is begun the cutting means bearing against the formation will operate to prevent rotation of the body 10 and allow the cutting operation to be satisfactorily carried to completion.

While I have disclosed specific modifications of the present invention, it will be obvious that changes may be made without departing from the scope of the invention. It is therefore my intention to claim the invention as broadly as the prior art permits.

I claim:

1. A well slotting device adapted to be secured to a drill stem, comprising, in combination, an elongated body, oppositely extensible arms pivoted to said body, hydraulically operated means arranged to extend said arms under pressure transmitted through said drill stem, an endless cutting chain carried by said arms and arranged for longitudinal movement with respect to said body and to be laterally extended by said arms, and means arranged to transmit power from the drill stem to said chain to drive the chain while the body remains stationary.

2. A well slotting device adapted to be secured to a drill stem, comprising, in combination, an elongated body, a plurality of arms pivoted to form a laterally expansible parallelogram mounted on said body, hydraulically operated means arranged for laterally extending said arms upon the transmission of pressure to said means from the drill stem, an endless cutting chain carried by said arms and arranged for longitudinal movement with respect to said body and to be laterally extended by said arms, and means arranged to transmit power from the drill stem to said chain to drive the chain while the body remains stationary.

3. A device in accordance with claim 2 in which the body is provided with passages in fluid communication with the drill stem and discharging upwardly at points below the lowermost portion of the cutting chain.

BENJAMIN W. SEWELL.